(12) United States Patent
Trythall

(10) Patent No.: US 10,473,937 B2
(45) Date of Patent: Nov. 12, 2019

(54) DISPLAYS

(71) Applicant: BAE SYSTEMS plc, London (GB)

(72) Inventor: Simon Trythall, Rochester (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 15/767,222

(22) PCT Filed: Oct. 3, 2016

(86) PCT No.: PCT/GB2016/053069
§ 371 (c)(1),
(2) Date: Apr. 10, 2018

(87) PCT Pub. No.: WO2017/064469
PCT Pub. Date: Apr. 20, 2017

(65) Prior Publication Data
US 2019/0072768 A1    Mar. 7, 2019

(30) Foreign Application Priority Data

Oct. 13, 2015 (GB) .................................... 1518113.4

(51) Int. Cl.
*G02B 27/01* (2006.01)
*G06F 3/01* (2006.01)
(Continued)

(52) U.S. Cl.
CPC ..... *G02B 27/0172* (2013.01); *G02B 27/0093* (2013.01); *G02B 27/0179* (2013.01);
(Continued)

(58) Field of Classification Search
CPC ............ G02B 27/0093; G02B 27/0172; G02B 27/0179; G02B 2027/0187;
(Continued)

(56) References Cited

U.S. PATENT DOCUMENTS 5,764,202 A    6/1998  Welch et al.
8,970,495 B1   3/2015  Biffle et al.
(Continued)

FOREIGN PATENT DOCUMENTS

EP    1722342 A1    11/2006
EP    2159752 A1    3/2010
(Continued)

OTHER PUBLICATIONS

International Preliminary Report on Patentability received for PCT Application PCT/GB2016/053066. dated Apr. 26, 2018. 10 pages.
(Continued)

*Primary Examiner* — Nelson M Rosario
(74) *Attorney, Agent, or Firm* — Finch & Maloney PLLC

(57) ABSTRACT

A method and apparatus are provided for controlling a display device to generate an image for viewing by a user on a display, the image being formed by one or more light having predetermined relative timings. Received image data define one or more light components of a feature to be displayed as an element in the image. Rate data are received, e.g. from an associated tracker system, indicative of a rate of change in orientation of the display relative to a direction of gaze of an eye of the user. The received rate data are used to determine a position on the display for displaying each of the one or more light components of the feature including determining any respective adjustment required to a determined position for the light component according to the received rate data and the predetermined relative timings. The determined position of each of the one or more light components is output to the display device for display of the light component at the respective determined position.

20 Claims, 6 Drawing Sheets

(51) Int. Cl.
*G09G 3/00* (2006.01)
*G09G 3/20* (2006.01)
*G02B 27/00* (2006.01)
*G09G 5/02* (2006.01)

(52) U.S. Cl.
CPC .............. *G06F 3/012* (2013.01); *G06F 3/013* (2013.01); *G09G 3/001* (2013.01); *G09G 3/003* (2013.01); *G09G 3/2018* (2013.01); *G09G 5/02* (2013.01); *G02B 2027/0187* (2013.01); *G02B 2027/0198* (2013.01); *G09G 2310/0235* (2013.01); *G09G 2320/0261* (2013.01); *G09G 2340/0464* (2013.01); *G09G 2354/00* (2013.01)

(58) Field of Classification Search
CPC . G02B 2027/0198; G06F 3/012; G06F 3/013; G09G 3/001; G09G 3/003; G09G 3/2018; G09G 5/02; G09G 2354/0027; G09G 2310/0235; G09G 2320/0261; G09G 2340/0464; G09G 2354/00
See application file for complete search history.

(56) References Cited

U.S. PATENT DOCUMENTS

| | | | |
|---|---|---|---|
| 9,761,055 B2 * | 9/2017 | Miller | G06F 3/011 |
| 2014/0176591 A1 | 6/2014 | Klein et al. | |
| 2014/0247286 A1 | 9/2014 | Chi | |
| 2014/0375679 A1 | 12/2014 | Margolis et al. | |
| 2017/0068091 A1 | 3/2017 | Greenberg | |

FOREIGN PATENT DOCUMENTS

| | | |
|---|---|---|
| EP | 3014868 B1 | 2/2018 |
| WO | 2011018655 A2 | 2/2011 |
| WO | 2014172151 A1 | 10/2014 |
| WO | 2017/064467 A1 | 4/2017 |
| WO | 2017/064468 A1 | 4/2017 |
| WO | 2017/064469 A1 | 4/2017 |

OTHER PUBLICATIONS

International Preliminary Report on Patentability received for PCT Application PCT/GB2016/053067. dated Apr. 26, 2018. 10 pages.
International Preliminary Report on Patentability received for PCT Application PCT/GB2016/053069. dated Apr. 26, 2018. 11 pages.
GB Combined Search and Examination Report under Sections 17 and 18(3) received for GB Application No. 1616775.1, dated Mar. 15, 2017. 6 pages.
GB Combined Search and Examination Report under Sections 17 and 18(3) received for GB Application No. 1616786.8, dated Feb. 27, 2017. 5 pages.
GB Combined Search and Examination Report under Sections 17 and 18(3) received for GB Application No. 1616782.7, dated Mar. 31, 2017. 5 pages.
GB Search Report under Section 17(5)received for GB Application No. 1518110.0, dated Mar. 1, 2016. 3 pages.
GB Search Report under Section 17(5)received for GB Application No. 1518112.6, dated Mar. 1, 2016. 3 pages.
GB Search Report under Section 17(5)received for GB Application No. 1518113.4, dated Mar. 1, 2016. 3 pages.
International Search Report and Written Opinion Received for PCT Application PCT/GB2016/053066. dated Jan. 2, 2017. 13 pages.
International Search Report and Written Opinion Received for PCT Application PCT/GB2016/053067. dated Dec. 5, 2016. 13 pages.
International Search Report and Written Opinion Received for PCT Application PCT/GB2016/053069. dated Jan. 2, 2017. 15 pages.

* cited by examiner

DISPLAYS

This invention relates to display methods and devices for generating an image for display to a viewer. In particular, but not exclusively, the invention provides a method and apparatus for generating images for viewing on displays in such a way as to increase display luminance and to reduce display 'flicker' as may arise when there is relative movement of the display and a viewer's direction of gaze. The invention may be applied in particular to substantially transparent head or helmet-mounted display (HMD) systems.

It is known to attempt to achieve an increase in brightness of images for display in HMD systems by increasing the proportion (duty cycle) of an image refresh period, e.g. a period of 16.667 ms in the case of a 60 Hz display, during which a pixel of a display device is emitting light. In a digital display system, for example, this means that the pulse width modulation (PWM) scheme being used is required to allow for a pixel to emit light pulses over a greater proportion of the image refresh period. Given limitations in the achievable brightness of display illumination sources, e.g. light emitting diodes (LEDs), and limitations in optical efficiency, an increase in total light pulse duration during an image refresh period may be the only option for increasing image brightness.

It is also known to attempt to reduce display flicker by increasing the duration or to increase the number of light pulses emitted during an image refresh period.

However, it is also known that increasing the total duration over which light pulses may be emitted by a pixel in an HMD, for example, brings unwanted display artefacts when there is relative movement of the HMD and a direction of gaze of the viewer while displaying a generated image. In particular, the viewer may perceive a 'smearing' of the generated image over a region of the display during such relative movement. This problem is particularly noticeable when the viewer is observing an external scene against which a so-called 'space-stabilised' symbol is being displayed; the space-stabilised symbol intended to appear in the display overlain at a fixed position relative to a line of sight to a point in the external scene, irrespective of head movement. For this reason, it is generally desirable for a pixel to emit its light over as short a period as possible to reduce the incidence of image smearing, but with the associated limitation on maximum achievable pixel brightness and increased chance of seeing display flicker effects.

According to a first aspect of the present invention, there is provided a method for controlling a display device to generate an image for viewing by a user on a display, the image being formed by two or more light components having predetermined relative timings, the method comprising the steps:
(i) receiving image data defining one or more light components of a feature to be displayed as an element in the image;
(ii) receiving rate data indicative of a rate of change in orientation of the display relative to a direction of gaze of an eye of the user;
(iii) determining a position on the display for displaying each of the one or more light components of the feature including determining any respective adjustment required to a determined position for the light component according to the received rate data and the predetermined relative timings; and
(iv) outputting the determined position of each of the one or more light components to the display device for display of the light component at the respective determined position.

By this method, display brightness may be increased and the effective rate of displayed image refresh may also be increased without incurring problems of image smear or multiple image effects during relative movement of the display and the direction of gaze of a viewer's eye. Relative movement about any of the possible axes, i.e. in azimuth, elevation or roll, may be compensated for when determining the position at which to display each of the multiple light components of a feature within an image, if different to the position at which the feature would have been displayed in the absence of relative movement. In this way, multiple light components may be used within an image refresh period to achieve a required brightness level and each light component will be perceived to be correctly positioned on the display at the time it is displayed.

In an example embodiment, one of the two or more light components is selected as a reference light component such that, at step (iii), any said respective adjustment is determined using the timing of the light component relative to a timing of the selected reference light component, if different. This has the processing advantage in that an adjustment is not required for one of the light components when determining its position on the display.

In an example embodiment, the two or more different light components comprise three light components to be displayed sequentially and wherein the selected reference light component is the second light component to be displayed of the three light components. In the event that the light components of each component image are equally spaced in time, the adjustment required in respect of the first component has a simple relationship to the adjustment required for the third component, with a corresponding reduction in processing time.

In a further example embodiment, at step (iii), determining a position for displaying the one or more light components comprises receiving data indicative of an orientation of the display in inertial space and determining a position on the display such that the feature appears aligned to a predetermined line of sight to a point in inertial space. In that example, determining any respective adjustment may comprise determining a respective adjustment to the received data indicative of an orientation of the display such that the position of the light component is determined after applying the respective adjustment to the received orientation data.

In an example embodiment, the rate data measure a rate of change in orientation of the display in inertial space and the measured rate is indicative of the rate of relative movement of the display relative to the direction of gaze of the user assuming that the direction of gaze of the user is substantially fixed in inertial space.

In certain applications of the present invention, the opportunity for significant roll movements may be limited, such that the received rate data may define a rate of change in orientation of the display in azimuth and in elevation resolved in a frame of reference of the display, assuming no change in orientation of the display about a roll axis in the frame of reference of the display and assuming that the direction of gaze of the user is substantially fixed in inertial space. This enables only two components of rate data to be considered when positioning light components of features on a display. In particular, at step (iii), determining any respective adjustment comprises determining a linear displacement from a position at which the light component would be displayed if there was no relative movement of the display and the direction of gaze of the user, comprising a displacement in azimuth across the display determined using the received rate of change in orientation in azimuth combined with a displacement in elevation across the display determined using the received rate of change in orientation in elevation to give a net linear displacement across the display for display of the light component. The calculation of a linear shift provides for a simpler calculation of position than an adjustment to a rotation, enabled by the assumption of a zero roll rate.

In an example embodiment, the two or more light components comprise light components displayed in three respective phases, the phases having said predetermined relative timings.

In a further example embodiment, at step (iii), determining a position on the display for each of the one or more light components of the feature further comprises taking account of whether the image projection is a flat surface projection or a spherical projection. This enables a more precise positioning for display of the light components, recognising the effect of the type of image projection on the perceived position of space-stabilised symbols.

In an example embodiment, the received rate data are received from, or determined from output by, an eye tracker system associated with the display. Such a tracker enables relative movement of the display and the direction of gaze to be determined whether due to the user maintaining a fixed gaze upon an externally visible feature while the display moves, or due to changes in the direction of gaze of the eye, or a combination of the two.

In an example embodiment, the display is a head or helmet-mounted display (HMD) arranged to display collimated images. In such an application, the rate data may be received from, or derived from output by, a head or helmet tracker system.

According to a second aspect of the present invention there is provided, with equivalent advantages and benefits to the method of the first aspect, an apparatus for controlling a display device to generate an image for viewing by a user on a display, the image being formed by two or more light components having predetermined relative timings, the apparatus comprising:

an input for receiving image data defining one or more light components of a feature to be displayed as an element in the image;

an input for receiving rate data indicative of a rate of change in orientation of the display relative to a direction of gaze of an eye of the user; an image processor arranged:

(i) to determine a position on the display for displaying each of the one or more light components of the feature including determining any respective adjustment required to a determined position for the light component according to the received rate data and the predetermined relative timings; and (ii) to output the determined position of each of the one or more light components to the display device for display of the light component at the respective determined position.

In an example embodiment of the apparatus, one of the two or more light components may be selected as a reference light component such that, at step (i), the image processor is arranged to determine any said respective adjustment using the timing of the light component relative to a timing of the selected reference light component, if different.

In an example embodiment of the apparatus, the two or more different light components comprise three light components to be displayed sequentially and wherein the selected reference light component is the second light component to be displayed of the three light components.

In a further example embodiment of the apparatus, the two or more light components may comprise three light components and the predetermined relative timings may define equal time intervals between the times of display of the three light components.

In an example embodiment of the apparatus, at step (i), the image processor is arranged to determine a position for displaying the one or more light components by receiving data indicative of an orientation of the display in inertial space and determining a position on the display such that the feature appears aligned to a predetermined line of sight to a point in inertial space. In this example, the image processor may be arranged to determine any respective adjustment by determining a respective adjustment to the received data indicative of an orientation of the display such that the position of the light component is determined after applying the respective adjustment to the received orientation data.

In a further example embodiment of the apparatus, the received rate data measure a rate of change in orientation of the display in inertial space and the measured rate is indicative of the rate of relative movement of the display relative to the direction of gaze of the user assuming that the direction of gaze of the user is substantially fixed in inertial space.

In an example embodiment of the apparatus, the received rate data define a rate of change in orientation of the display in azimuth and in elevation resolved in a frame of reference of the display, assuming no change in orientation of the display about a roll axis in the frame of reference of the display and assuming that the direction of gaze of the user is substantially fixed in inertial space. This assumption enables the image processor, at step (i), to determine any respective adjustment by determining a linear displacement from a position at which the light component would be displayed if there was no relative movement of the display and the direction of gaze of the user, comprising a displacement in azimuth across the display determined using the received rate of change in orientation in azimuth combined with a displacement in elevation across the display determined using the received rate of change in orientation in elevation to give a net linear displacement across the display for display of the light component As for the first aspect, the two or more light components comprise light components displayed in three respective phases, the phases having said predetermined relative timings.

In a further example embodiment of the apparatus, the image processor is arranged, at step (i), to determine a position on the display for each of the one or more light components of the feature taking account of whether the image projection is a flat surface projection or a spherical projection.

The received rate data may be received from, or determined from output by, an eye tracker system associated with the display.

In a particular application of the second aspect of the present invention, the display is a head or helmet-mounted display (HMD) arranged to display collimated images. In that application, the rate data are received from, or derived from output by, a head or helmet tracker system.

According to a third aspect of the present invention, there is provided a head or helmet-mounted display (HMD) system comprising a display device for generating images for display on a head or helmet-mounted display and an image processor arranged to implement the method according to the first aspect of the invention.

According to a fourth aspect of the present invention, there is provided a computer program product comprising a computer-readable medium, or means for access thereto, having stored thereon computer program code which when loaded onto a digital processor and executed is arranged to implement the method according to the first aspect of the present invention.

According to a fifth aspect of the present invention, there is provided an image processor programmed to implement the method according to the first aspect of the present invention.

Example embodiments of the present invention will now be described in more detail with reference to the accompanying drawings, of which:

FIG. 1a provides a representation of a known method for generating a pixel using a sequence light pulses or image components of an appropriate duration and brightness within a given frame period or image refresh period;

FIG. 1b provides a representation of the known effect of eye movement relative to the display upon the perceived position of displayed components of a pixel;

Figure 4A:
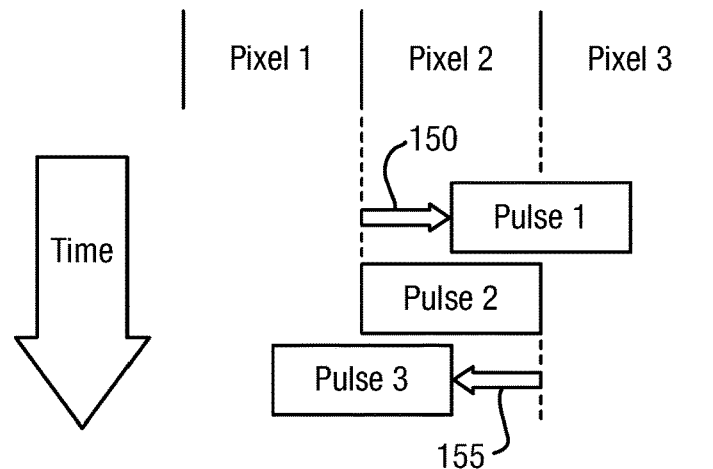
Figure 4B:
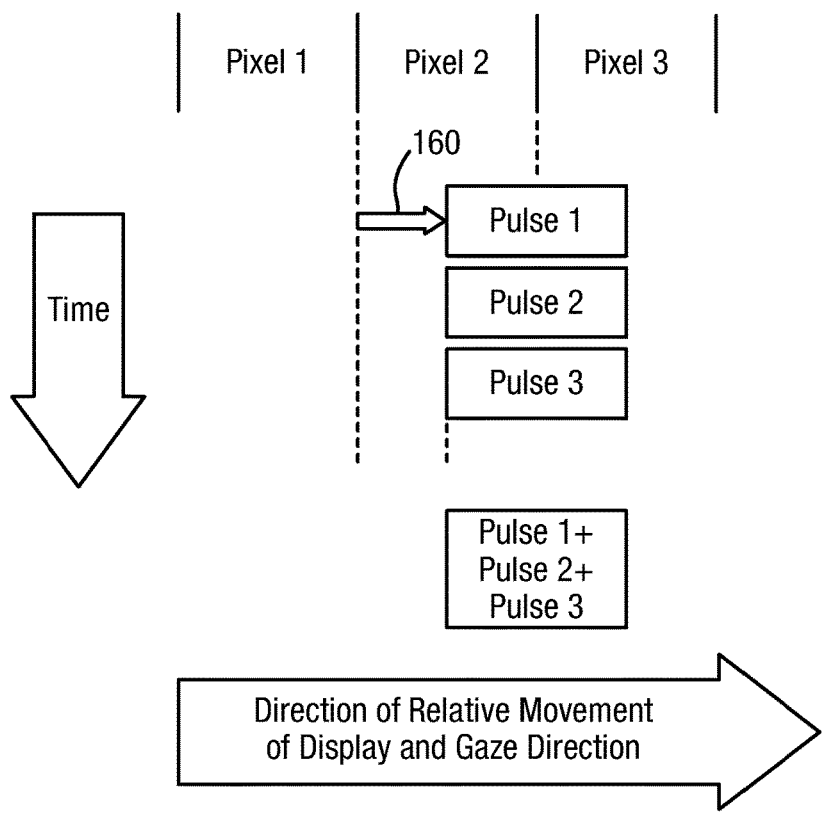
Figure 5:
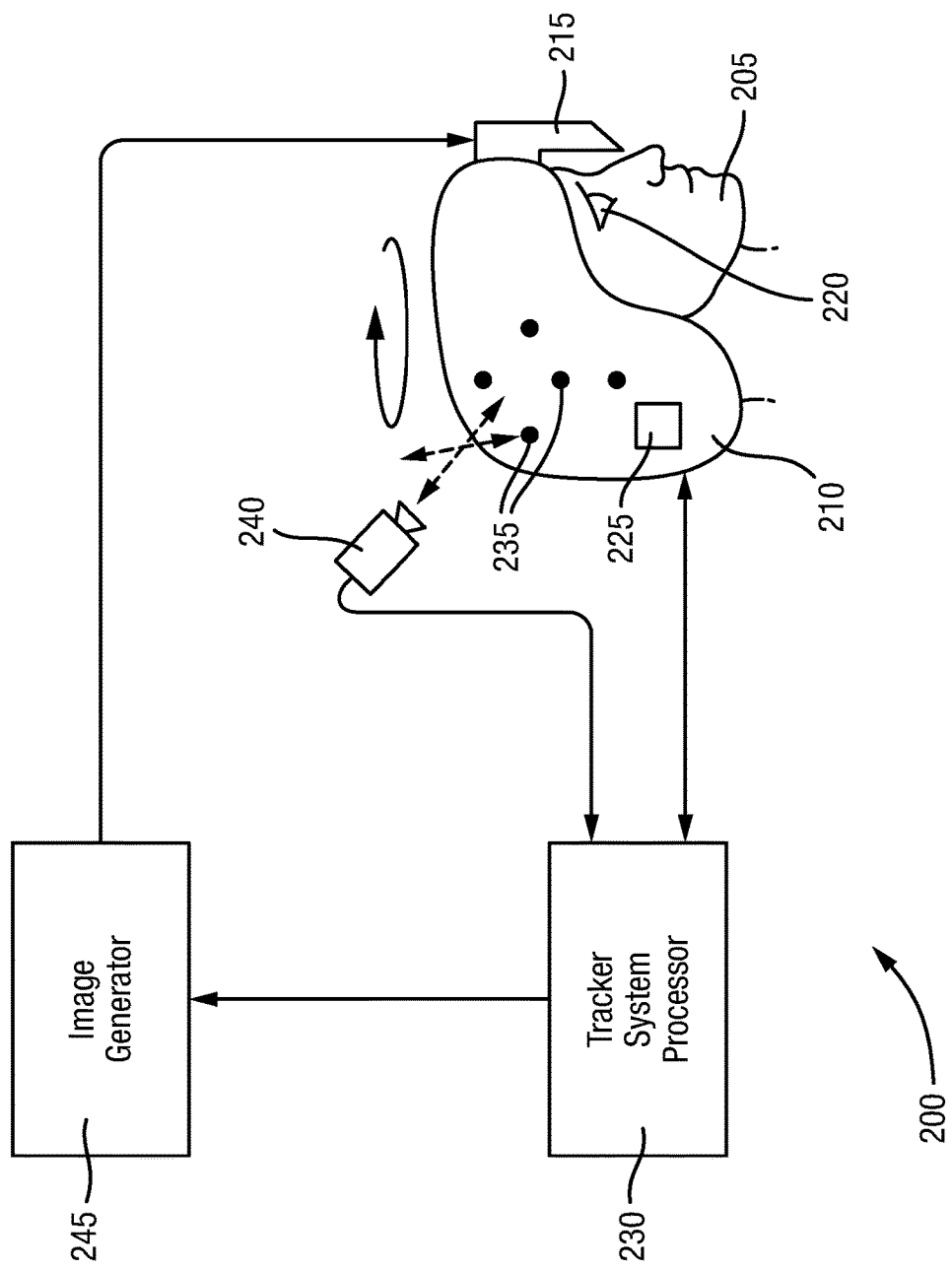

FIG. 4a provides an illustration of how the generation of image components may be varied in a region of an HMD image area by example embodiments of the present invention;

FIG. 4b provides an illustration of what a viewer perceives when viewing the region of an HMD image area subject to the variations shown in FIG. 4a according to example embodiments of the present invention; and FIG. 5 shows the components of a typical HMD system in which example embodiments of the present invention may be implemented.

Known head or helmet-mounted display (HMD) systems include a digital display device, under the control of an image processor, and a transparent combiner in the form of a helmet visor or a waveguide positioned in front of one or other eye of a user in the user's line of sight to an external scene so that images output by the display device may be projected onto the interior surface of the visor and reflected towards the viewer's eye or conveyed through the waveguide and output along that line of sight to appear overlain on the user's view of the external scene. The display device may comprise a digital micro-mirror device (DMD) or Liquid Crystal on Silicon (LCoS) display device, for example, having pixel-sized elements each separately controllable to reflect, emit or transmit light from one or more illuminating light sources, according to the type of display device. Light may be output from the display device at each pixel position in the form of a predefined sequential combination of discrete pulses of light of equal intensity but of a variety of durations. The eye integrates the discrete light pulses output at each pixel position over an image refresh period—16.667 ms in the case of an example 60 Hz display refresh rate—and perceives a pixel of a brightness determined by the total duration of pulses output during the image refresh period.

Of course other methods as would be known to a person of ordinary skill in the art are available for achieving a required level of light output by a pixel in a display during an image refresh period. In the case of a colour display, a corresponding display device would be controlled to emit pulses of red, green and blue light sequentially during an image refresh period of a relative duration determined by the colour that a viewer is intended to perceive.

However, as mentioned above, whichever method is used to cause a pixel to emit light of an appropriate duration, the greater that total duration, the greater are the chances of a viewer perceiving image smearing effects, including a perception of multiple images, when there is relative movement of a user's eye relative to the display image area. Such relative movement may be due either to movement of the eye itself to alter the direction of gaze to different features in the external scene (saccadic eye movement), or to movement of the head, and hence of the display, while the eye maintains a fixed gaze upon a feature visible in the external scene (vestibulo-ocular reflex, in the case where the fixed direction of gaze is to fixed feature in inertial space).

Example embodiments of the present invention provide a way to increase the overall light output by a pixel in a display device and to reduce the incidence of display flicker without incurring the above-mentioned smearing or multiple image effects in a monochrome display. The invention provides a way to control a display device to increase the proportion of an image refresh period during which a pixel may emit light by dividing the image refresh period into discrete phases or pulse periods during which 'light components' of the image or of symbols or features within the image may be displayed, being either periods of continuous illumination or periods comprising a set of light pulses according to an existing pulse width modulation (PWM) scheme, the PWM scheme being therefore repeated in respect of each light component. Each light component is subject to modified treatment according to the invention to avoid the above-mentioned smearing effects that would otherwise continue to occur, as will be described briefly with reference to FIG. 1.

Figure 1A:
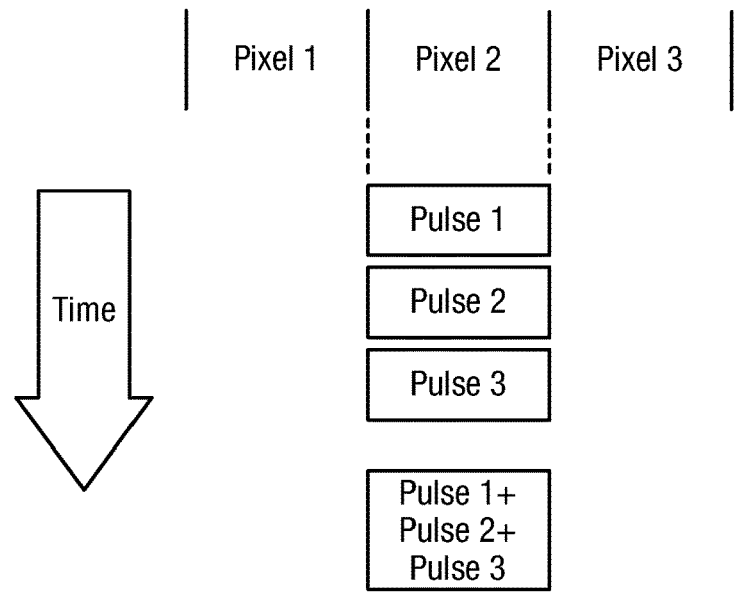

Referring initially to FIG. 1a, an example division of an image refresh period into three phases is shown during which component light Pulses 1, 2 and 3 respectively are displayed, in this example of substantially equal duration, for Pixel 2 in a group of three adjacent pixels (Pixels 1, 2 and 3) within the image area of a display. It is assumed in this representation that there is no change of eye gaze direction relative to the display during the periods in which Pulses 1, 2 and 3 and being emitted so that the viewer perceives Pixel 2 to be a pixel of a brightness represented by the total duration of Pulses 1, 2, and 3.

Figure 1B:
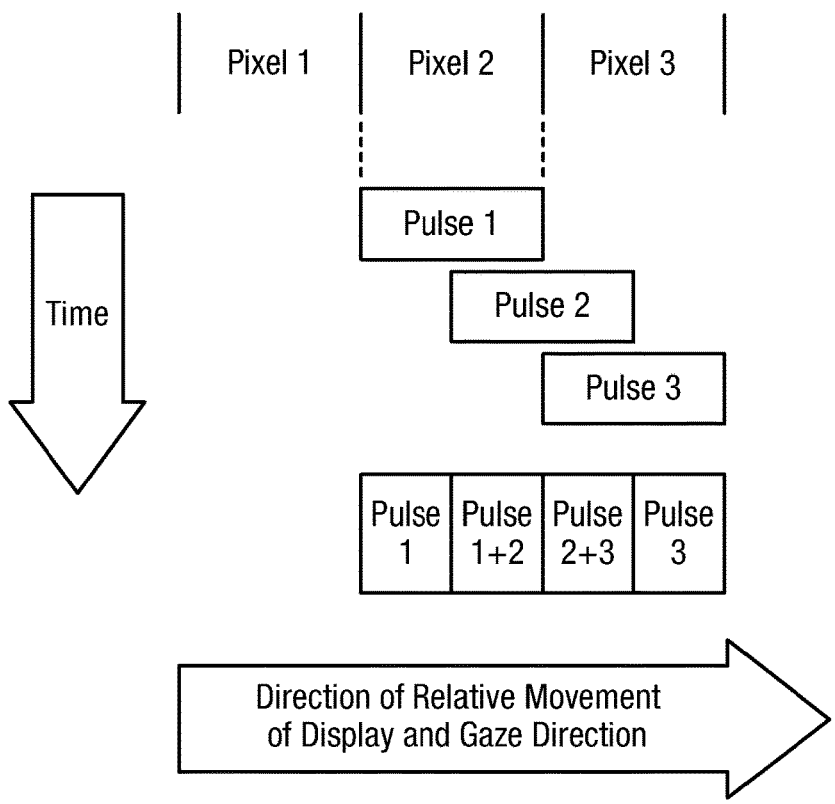

Referring to FIG. 1b, the effect of eye movement relative to the display can be seen to cause Pulse 2 and Pulse 3 to appear displaced from the intended pixel position at the times they are generated. The result of this displacement is that the eye integrates different combinations of light from Pulses 1, 2 and 3 in the region of the display covering pixels 2 and 3, in this example, and the viewer perceives the light intended for Pixel 2 to be smeared according to the extent of displacement of the three component light pulses over that region. Pixel 2 no longer appears to have the intended brightness and the viewer sees a range of varying light levels resulting from the combinations of Pulse 1 alone, Pulse 1 and Pulse 2, Pulse 2 and Pulse 3 and Pulse 3 alone according to the extent of positional overlap in the perceived displaced positions of the three pulses.

If the three component light pulses shown in FIG. 1 were of different colours, then the effect of displacement of light pulses would be perceived as a break-up of the colours intended for Pixel 2, with the viewer seeing a range of different colours according to the overlapping combinations of pulse colour at each position on the display.

The problem illustrated in FIG. 1b occurs in particular when the display system is displaying so-called 'space-stabilised' symbols that are intended to appear in the display as if fixed in space relative to a line of sight to a point in an externally visible scene, irrespective of head movement. In order to appear fixed in space, a space-stabilised symbol must be continually repositioned in the display, using display orientation data supplied by an associated tracker system, to compensate for movement of the viewer's head or helmet and hence of the display relative to the viewer's direction of gaze. As the viewer's gaze tends to remain fixed on a line of sight to a feature visible in inertial space during head movement, not necessarily the same point as that to which the symbol is aligned, light pulses generated in displaying the repositioned pixels of space-stabilised symbols may be received at different points on the retina of the viewer's eye, resulting in the perceived effect shown in FIG. 1b.

According to example embodiments of the present invention, a scheme is provided for generating images using light pulses emitted during multiple discrete phases or pulse periods over a chosen proportion of an image refresh period in such a way as to avoid image smearing or multiple image effects.

To put the present invention into context, a known method for positioning symbols or other features in generated images will firstly be described with reference to FIG. 2 and improvements to that method provided by the present invention will then be described with reference to FIG. 3.

Figure 2:
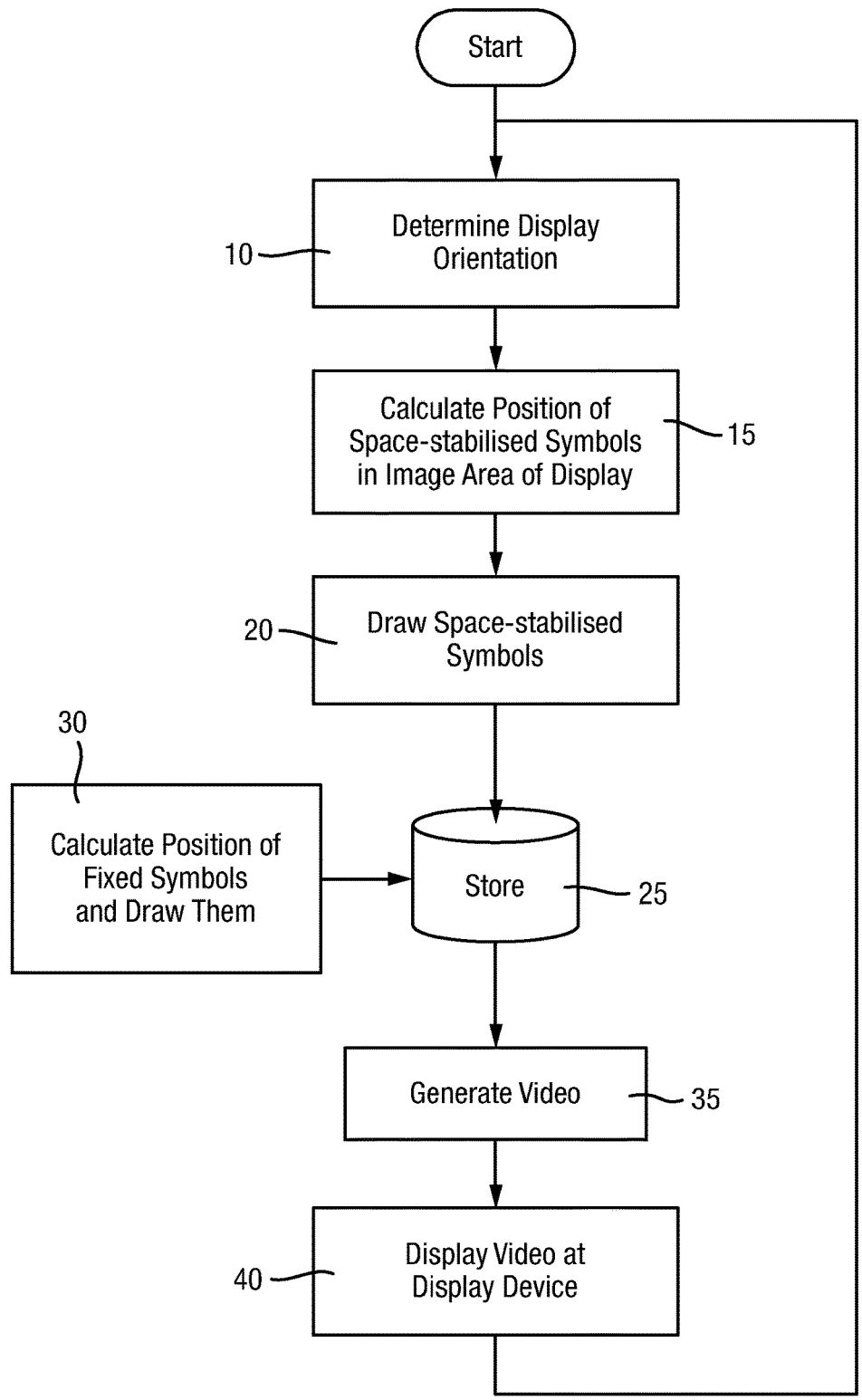
FIG. 2 is a flow diagram showing the steps in a known process for generating an image including space-stabilised symbols in a head or helmet-mounted display (HMD)

Referring initially to FIG. 2, a flow diagram is provided showing steps in a known process for generating an image comprising fixed and space-stabilised symbols for display by an HMD. The process begins at STEP 10 determining the orientation of the display relative to an inertial frame of reference. This step may be carried out by a head or helmet tracker system, for example as described in co-pending UK patent application GB1516120.1 by the present Applicant, assuming that the display is fixed immovably to the head or helmet. Orientation data determined at STEP 10 are used at STEP 15 to calculate the required position in the image area of the display of each space-stabilised symbol for a current image refresh period. Each symbol is 'drawn' at STEP 20, generating a data set determining the required brightness of each pixel in the image area of the display over the image refresh period to display the generated symbols at their determined positions. A data set defining the drawn symbols is stored in an image store 25.

Any symbols required to be displayed at fixed positions within the image area of the display may be positioned and drawn at STEP 30 and the resultant data set stored in the image store 25.

At STEP 35, the contents of the image store 25 are output and used to generate video data, combining the determined pixel characteristics defined at STEP 20 with those defined at STEP 30. The generated video data are then output to a display device of the display system to generate the image for the image refresh period such that, at STEP 40, it appears on the display visible to the viewer. The process then resumes at STEP 10 for the next image refresh period.

In a known technique for calculating, at STEP 15, the position of symbols required to appear aligned in an HMD to a line of sight to a point in inertial space, the orientation of the HMD in inertial space, as determined by an associated tracker system at STEP 10, may be represented by a rotation matrix [HW], $$\begin{bmatrix} \cos(e)\cos(a) & \cos(e)\sin(a) & -\sin(e) \\ \sin(r)\sin(e)\cos(a) - \cos(r)\sin(a) & \sin(r)\sin(e)\sin(a) + \cos(r)\cos(a) & \sin(r)\cos(e) \\ \cos(r)\sin(e)\cos(a) + \sin(r)\sin(a) & \cos(r)\sin(e)\sin(a) - \sin(r)\cos(a) & \cos(r)\cos(e) \end{bmatrix}$$

where a, e and r are Euler angles in azimuth, elevation and roll, respectively.

The matrix [HW] defines a transformation of a known line of sight vector $P_W$ to a point in inertial space into a line of sight vector $P_H$ to the point in a frame of reference of the HMD. Thus, $$P_H = [HW]P_W \quad (1)$$

The vector $P_W$ would typically be known from associated systems. For example, if the feature were a known waypoint, the relative position of the user and hence of the display in inertial space would be known from GPS or other sources. At STEP 15, the determined line of sight vector $P_H$ may be converted into display coordinates, according to:

$$X_D = S\frac{y_H}{x_H} \quad Y_D = S\frac{z_H}{x_H} \quad (2)$$

where $(X_D, Y_D)$ are the display coordinates, $X_H$, $Y_H$ and $Z_H$ are the components of the vector $P_H$ and S is a scaling factor for the display.

The inventors in the present invention have realised that the rate of change in orientation of the HMD, as would typically be available from a tracker system or derivable from data output from orientation data output by a tracker system, may also be input to the calculation of symbol positioning so that an adjustment to the matrix [HW] in the form of a rotation matrix [H'H] may be calculated in respect of each light component, based upon that rate of change in HMD orientation and the timing of the phase in which a light component is to be displayed relative to the time of displaying light components in a selected one of the other phases, chosen as a reference phase. The adjustment matrix [H'H] may then be used in the calculation of an adjusted line of sight vector $P'_H$, modifying equation (1) as follows:

$$P'_H = [H'H][HW]P_W \quad (3)$$

The adjusted vector $P'_H$ applicable to a given light component may then be used to calculate an adjusted position for the light component on the display relative to a light component of the selected reference phase. In this calculation, the components of the vector $P'_H$ replace those of the unadjusted vector $P_H$ in equations (2) to give the display position of the light component. No adjustment in displayed position is required for the light component in the selected reference phase whose displayed position remains that calculated according to equations (1) and (2) using the unadjusted matrix [HW].

The calculated positions are used to draw the respective light components of the symbol such that each light component appears in the display to be aligned to the direction of its respective adjusted direction $P'_H$ or, in the case of the light component in the selected reference phase, unadjusted direction $P_H$. The light components of the symbol therefore appear in the display to be aligned during that relative movement of the display and the assumed fixed direction of gaze of the user.

Conveniently, in this example embodiment of the present invention, the tracker system may include a prediction capability so that the rotation matrix [HW] may be synchronised to the time at which the light component in the selected reference phase, in this example the light component in the second phase (Pulse 2 in the example of FIG. 1) in a sequence of three light pulses, is expected to be visible at the display. This provides for a more accurate alignment of the symbol with the intended line of sight. However, a lack of synchronisation would not in itself be expected to affect the achievement of a perceived alignment of the light components of the symbol. More importantly, if the rate data are synchronised to the expected time of displaying at least one of the light components, for example those during the selected reference phase, then it may be expected that the light components will appear more accurately aligned in the display, in particular where the rate of relative movement happens to be changing rapidly at that time.

For the light pulse in the selected reference phase, no adjustment is required to the matrix [HW] and equation (1) applies in positioning the symbol in the display. However, the adjustment rotation matrix [H'H] for a first phase light component may be approximated to $$\begin{bmatrix} 1 & \partial A_z & -\partial A_y \\ -\partial A_z & 1 & \partial A_x \\ \partial A_y & -\partial A_x & 1 \end{bmatrix}$$

where $\partial_{A_x} = \Delta t_{12} r_x$, $\partial_{A_y} = \Delta t_{12} y$ and $\partial_{A_z} = \Delta t_{12} r_z$. $\Delta t_{12}$ is the time between the light pulses of the first and second phases and $r_x$, $r_y$ and $r_z$ are the HMD rotation rates in radians per second resolved along the axes of the HMD frame of reference.

Similarly, and assuming $\Delta t_{32} = -\Delta t_{12}$, i.e. the pulse interval between the first and second phase light components and the pulse interval between third and second phase light components are equal in magnitude but negated, then [H'H] for the pulses of the third phase light component is simply the transpose of [H'H] for the first phase light component.

If the first phase were to be selected as the reference phase, then the adjustment rotation matrices [H'H] would be determined based upon the timings of pulses in the subsequent second and third phases relative to those of the first phase.

Typically, head rotations comprise only horizontal and vertical components, given the design of pilot helmets and the confines of an aircraft cockpit. In such circumstances a simplification to the above calculations is possible whereby the roll rate $r_x$ is assumed to be zero. Such a simplification provides an opportunity to adopt a simpler displacement method for determining an adjusted position in the display for space-stabilised symbols rather than the rotational adjustment method described above.

The displacements required in horizontal position and vertical position may be determined on a similar basis to the rotational adjustment method above using the relative timing of pulses for the different light components and the azimuth and elevation rates of change in HMD orientation $r_y$ and $r_z$ respectively received from the tracker system, according to the equations:

$$\text{Shift in horizontal position} = \frac{s \times \Delta t \times r_z}{\cos^2(Sym_x)} \quad (4)$$

$$\text{Shift in vertical position} = \frac{s \times \Delta t \times r_y}{\cos^2(Sym_y)} \quad (5)$$

where s is the angular size in radians of the centre pixel of the display, $\Delta t$ is the required time difference in seconds of the correction, in practice the time difference between a reference time point to which the tracker system is synchronised, e.g. the time of displaying the second light component, as above, and the time of displaying pulses of each of the other components, $r_y$ and $r_z$ are the HMD rotation rates in radians per second obtained from the corrected gyro rates in HMD axes, and $Sym_x$ and $Sym_y$ are the pre-shifted x and y display positions of the symbol calculated at STEP 15.

It is assumed in equations (4) and (5) that the image projection in the HMD is a flat surface projection where, for example, the horizontal display position of a symbol at an azimuth angle $A_z$ is proportional to $\tan(A_z)$. If the image is to be projected by spherical projection, then a simplification of equations (4) and (5) is possible in which the divisor $\cos^2$ terms may be assumed to take the value 1, such that:

$$\text{Shift in horizontal position} = s \times \Delta t \times r_z \quad (6)$$

$$\text{Shift in vertical position} = s \times \Delta t \times r_y \quad (7)$$

An improvement to the process described earlier with reference to FIG. 2 will now be described with reference to FIG. 3, implementing the techniques described above for positioning light components of space-stabilised symbols in an HMD according to an example embodiment of the present invention.

Figure 3:
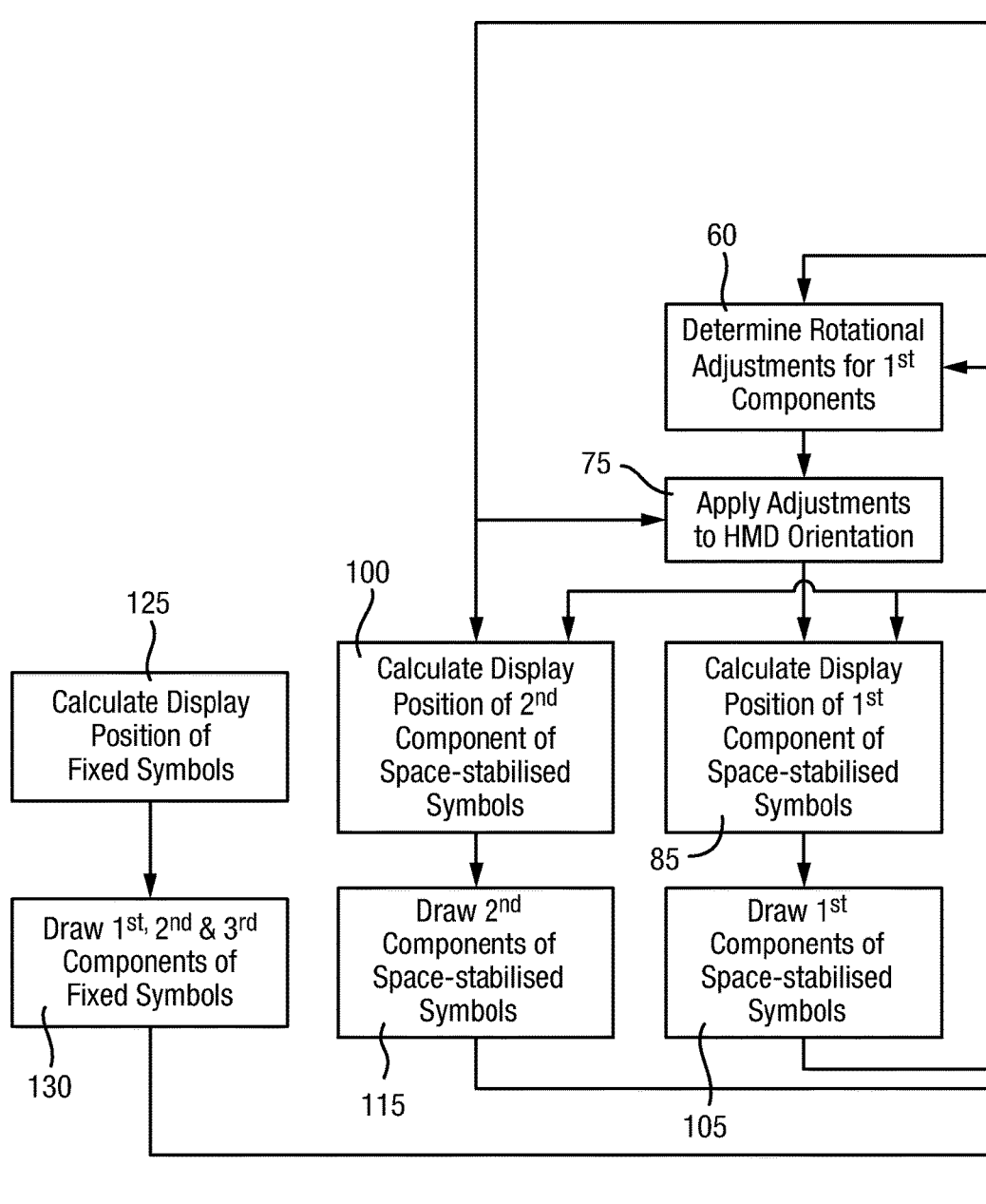
FIG. 3 is a flow diagram showing an improved image generation process according to example embodiments of the present invention.
Figure 3:
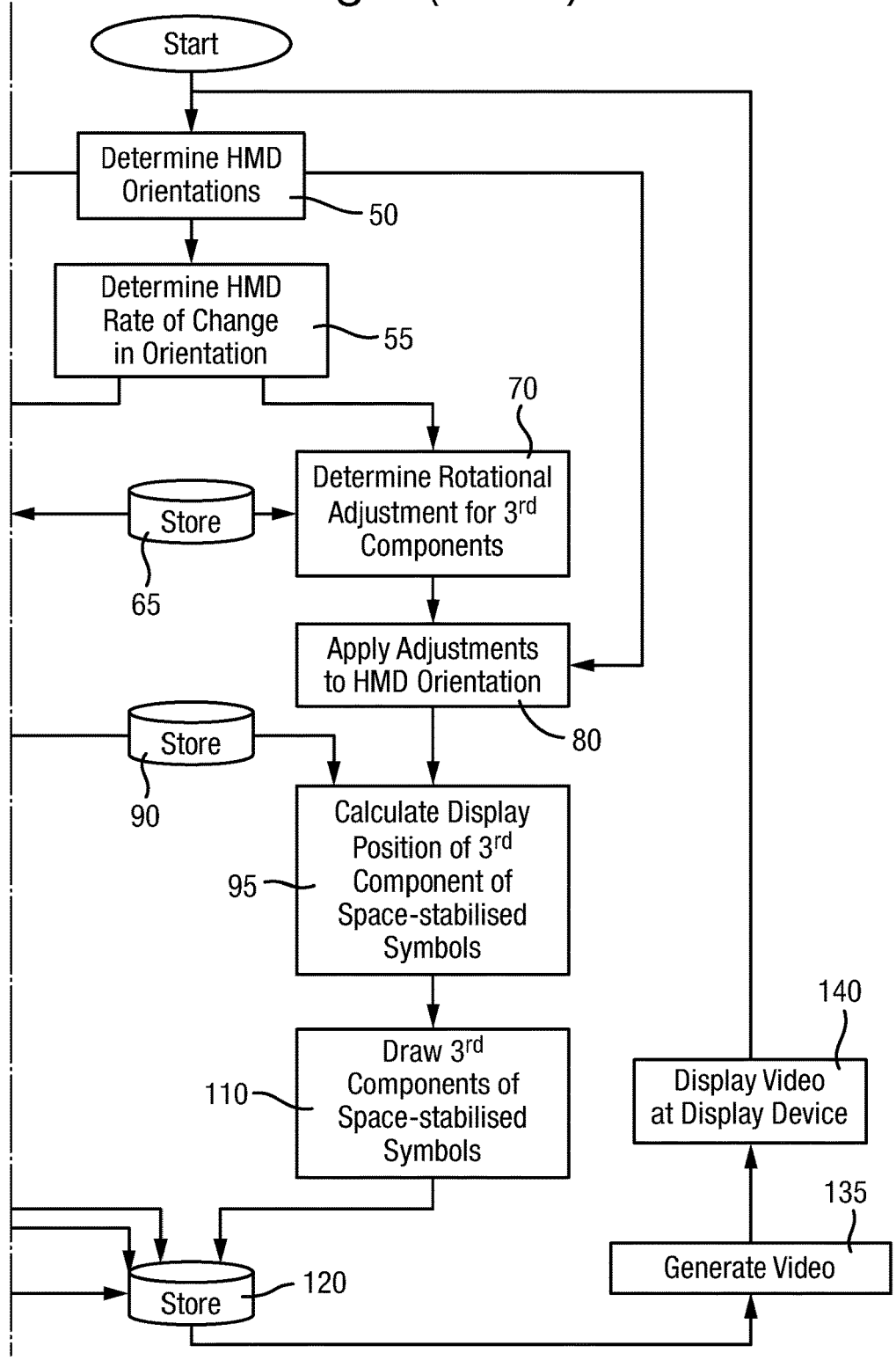

Referring to FIG. 3, the improved process begins at STEP 50 in respect of a given image refresh period in determining the orientation of the HMD using a known tracker system, for example in the form of a rotation matrix [HW] as described above. At STEP 55, the rate of change in orientation of the HMD is also determined, either by the HMD tracker system or more locally using a recent history of received orientation data from the tracker system.

At STEP 60, the determined rate from STEP 55 is used, together with predetermined information read from a STORE 65 giving the relative timing of light components in the first phase relative to those in the second phase, to determine a rotational adjustment to the HMD orientation, for example a rotation matrix [H'H] as described above, applicable to the first phase components of space-stabilised symbols to be displayed. Similarly, at STEP 70, the determined rate from STEP 55 is used, together with predetermined information read from a STORE 65 giving the relative timing of light components in the third phase relative to those of the second phase, to determine a rotational adjustment applicable to the third phase components of space-stabilised symbols to be displayed. The determined rotational adjustments [H'H] are applied at STEP 75 and STEP 80 to the HMD orientation [HW] determined at STEP 50 for the first and third phase components, respectively.

The adjusted HMD orientation determined at STEP 75 for the first phase components is then used at STEP 85, together with already determined data defining a known direction to a point in inertial space, read from a STORE 90, to which a space stabilised symbol is to be aligned, to calculate a position on the HMD image area for displaying the first phase component of the symbol. Similarly, at STEP 95, the adjusted HMD orientation determined at STEP 80 for the third phase components is used, together with the already determined data defining the direction to the feature in inertial space, read from a STORE 90, to calculate a position on the HMD image area for displaying the third phase component of the symbol.

The HMD orientation determined at STEP 50 is used at STEP 100 to calculate a position for displaying the 'reference' second phase light component of the space-stabilised symbol. The positions determined at STEP 85, STEP 95 and STEP 100 are then used at STEP 105, STEP 110 and STEP 115 respectively to draw the first, third and second phase components of the symbol, as in STEP 20 of the known process shown in FIG. 2. The data defining the characteristics of pixels involved in displaying the space-stabilised symbol are stored in an image STORE 120.

The position of any symbols to be drawn at a fixed position in the image area of the HMD is calculated at STEP 125 and the light components of the fixed symbols are drawn at STEP 130. The resultant data are stored in the image STORE 120.

Having accumulated all the data required to define pixel characteristics for an image refresh period, the contents of the image STORE 120 are read and used at STEP 135 to generate video data to be used, at STEP 140, to generate an image at a display device of the HMD. The process the resumes at STEP 50 for the next image refresh period.

The effects of implementing the improved image generation process described above will now be illustrated with reference to FIG. 4.

Referring to FIG. 4a, and additionally to FIG. 1a, the results of applying the above techniques to determine the display positions for the three phases of light components can be seen for an example rate of relative movement. In this example, the determined position of each of the pulses of the first and third phase light components intended for Pixel 2 of a space-stabilised symbol can be seen to be displaced to the right (150) and to the left (155), respectively, of the second 'reference' phase light component, as compared with the positioning shown in FIG. 1a where there is substantially no relative movement. It can be seen in FIG. 4a that the position of the selected 'reference' second phase light component on the display is not changed in comparison to its indicated position in FIG. 1a by the present invention. Of course, in general, the first and third light components will be displaced according to the rotational correction determined at STEP 60 and STEP 70, respectively, resulting in a two-dimensional vector displacement of those components across the image area of the HMD unless, as in this illustrated example, the direction of relative movement of the HMD and eye gaze direction is substantially in azimuth.

Referring now to FIG. 4b, and additionally to FIG. 1b, the viewer's perception of the effect of the repositioned light components for Pixel 2 of a space-stabilised symbol is illustrated during relative movement of the HMD and eye gaze direction. As can be seen, the viewer perceives the light Pulses 1, 2 and 3 of the three phases of light components to be co-located in the image area of the HMD, although slightly displaced overall by an extent 160 from the intended position of Pixel 2, and the viewer perceives Pixel 2 of the required brightness. The fractional shift 160 in perceived position of a displayed pixel, shown in FIG. 4b as a displacement 160, during such relative movement has been found not to impair the viewer's perception of the symbol and the overall image significantly.

Example embodiments of the present invention may be implemented in any head or helmet-based digital display system with access to tracker data giving an indication of eye movement relative to the display. An example helmet-mounted display system in which embodiments of the present invention may be implemented will now be described in outline with reference to FIG. 5.

Referring to FIG. 5, there is shown a representation of an HMD system, for example for use by a pilot 205 wearing a helmet 210 equipped with components of a helmet tracker system and incorporating a helmet-mounted display, in this example a substantially transparent waveguide display 215 positioned in front of an eye 220 of the pilot 205. The tracker system may include one or more inertial sensors 225 mounted upon the helmet 210, arranged to supply data to a Tracker System Processor 230. The tracker system may also include an optical helmet tracker comprising an arrangement of light-emitting diodes (LEDs) 235 integrated within the shell of the helmet 210 and controllable by the Tracker System Processor 230 to emit pulses of light. The optical helmet tracker also includes an arrangement of one or more cameras 240 (one of which is shown in FIG. 5) at known fixed positions arranged to detect light from the helmet-mounted LEDs 235 and to send corresponding signals to the Tracker System Processor 230.

The Tracker System Processor 230 is arranged to interpret the data received from the inertial sensors 225 and from the cameras 240 of the optical helmet tracker system to determine orientation of the helmet 210 and hence of the display 215 in inertial space or relative to an aircraft for example (not shown in FIG. 5) in which the pilot 205 may be travelling. The Tracker System Processor 230 may also determine a rate of change in orientation of the helmet and hence of the display 215 from those data inputs and output display orientation and rate of change data to an Image Generator 245. The Image Generator 245 is arranged to generate images, including space-stabilised images for display to the pilot viewing the helmet-mounted display 215 such that they appear overlain on the pilot's view through the transparent waveguide 215 of the outside world.

The Image Generator 245 may be arranged to implement the techniques described above for taking account of detected movement of the pilot's eye 220 or direction of gaze relative to the image area of the helmet-mounted display 215, using data from the Tracker System Processor 230, when positioning different light components of space-stabilised symbols with the aim of reducing the perceived incidence of image smearing or multiple image effects during movement of the eye 220 or the pilot's direction of gaze relative to the image area of the display 215.

Example embodiments of the present invention have been described in the context of a head or helmet-mounted digital display system as may be used on an aircraft, for example. However, the principles of operation of an improved image processor incorporating the techniques described above may be applied more widely, as would be apparent to a person of ordinary skill in the relevant art, to compensate for relative movement of a viewer's eye and the image area of a display and so avoid or substantially reduce the perceived effects of image smearing in generated images. Information defining such eye movement may be supplied by a head or helmet tracker or an eye tracker for tracking the actual displacements of a viewer's eye, and therefore their line of sight, relative to the image area of the display. Either source of tracking data may be used in the example embodiments of the present invention described above.

The invention claimed is:

1. A method for controlling a display device to generate an image for viewing by a user on a display, the image being formed by at least three light components having predetermined relative timings, the method comprising:
   receiving image data defining an intended position of first, second, and third light components of a feature to be sequentially displayed as an element in the image;
   receiving rate data indicative of a rate of change in orientation of the display relative to a direction of gaze of an eye of the user;
   determining a displaced position on the display for displaying each of the first and third light components of the feature by adjusting the intended position of the first and third light components according to the received rate data and the predetermined relative timings relative to a timing of the second light component, the displaced position of the first and third light components being different from the intended position of the second light component; and
   outputting the displaced position of each of the first and third light components to the display device for display of the first and third light components at the respective displaced position, and outputting the intended position of the second light component to the display device for display of the second light component at the intended position.

2. The method according to claim 1, wherein determining the displaced position on the display for displaying each of the first and third light components includes receiving data indicative of an orientation of the display in inertial space and determining a position on the display such that the feature appears aligned to a predetermined line of sight to a point in inertial space.

3. The method according to claim 2, wherein adjusting the intended position of the first and third light components includes determining a respective adjustment to the received data indicative of an orientation of the display such that the displaced position on the display for displaying each of the first and third light components is determined after applying the respective adjustment to the received orientation data.

4. The method according to claim 2, wherein the received rate data measure a rate of change in orientation of the display in inertial space and the measured rate is indicative of the rate of relative movement of the display relative to the direction of gaze of the user assuming that the direction of gaze of the user is substantially fixed in inertial space.

5. The method according to claim 4, wherein the display is a head or helmet-mounted display (HMD) arranged to display collimated images and wherein the rate data are received from, or derived from output by, a head or helmet tracker system.

6. The method according to claim 2, wherein the received rate data define a rate of change in orientation of the display in azimuth and in elevation resolved in a frame of reference of the display, assuming no change in orientation of the display about a roll axis in the frame of reference of the display and assuming that the direction of gaze of the user is substantially fixed in inertial space.

7. The method according to claim 6, wherein adjusting the intended position of the first and third light components includes determining a linear displacement from a position at which the respective light component would be displayed if there was no relative movement of the display and the direction of gaze of the user, including a displacement in azimuth across the display determined using the received rate of change in orientation in azimuth combined with a displacement in elevation across the display determined using the received rate of change in orientation in elevation to give a net linear displacement across the display for display of the light component.

8. The method according to claim 1, wherein the first, second, and third light components include light components sequentially displayed in three respective phases, the phases having said predetermined relative timings.

9. An image processor programmed to implement the method according to claim 1.

10. An apparatus for controlling a display device to generate an image for viewing by a user on a display, the image being formed by at least three light components having predetermined relative timings, the apparatus comprising:
    an input for receiving image data defining an intended position of first, second, and third light components of a feature to be sequentially displayed as an element in the image;
    an input for receiving rate data indicative of a rate of change in orientation of the display relative to a direction of gaze of an eye of the user; and
    an image processor arranged to
       determine a displaced position on the display for displaying each of the first and third light components of the feature by adjusting the intended position of the first and third light components according to the received rate data and the predetermined relative timings relative to a timing of the second light component, the displaced position of the first and third light components being different from the intended position of the second light component, and
    output the displaced position of each of the first and third light components to the display device for display of the first and third light components at the respective displaced position, and outputting the intended position of the second light component to the display device for display of the second light component at the intended position.

11. The apparatus according to claim 10, wherein the image processor is configured to determine the displaced position on the display for displaying the first and third light components by receiving data indicative of an orientation of the display in inertial space and determining a position on the display such that the feature appears aligned to a predetermined line of sight to a point in inertial space.

12. The apparatus according to claim 11, wherein the image processor is configured to adjust the intended position of the first and third light components by determining a respective adjustment to the received data indicative of an orientation of the display such that the displaced position on the display for displaying each of the first and third light components is determined after applying the respective adjustment to the received orientation data.

13. The apparatus according to claim 11, wherein the received rate data measure a rate of change in orientation of the display in inertial space and the measured rate is indicative of the rate of relative movement of the display relative to the direction of gaze of the user assuming that the direction of gaze of the user is substantially fixed in inertial space.

14. The apparatus according to claim 11, wherein the received rate data define a rate of change in orientation of the display in azimuth and in elevation resolved in a frame of reference of the display, assuming no change in orientation of the display about a roll axis in the frame of reference of the display and assuming that the direction of gaze of the user is substantially fixed in inertial space.

15. The apparatus according to claim 10, wherein the at least three light components include light components sequentially displayed in three respective phases, the phases having said predetermined relative timings.

16. The apparatus according to claim 10, wherein the received rate data are received from, or determined from output by, an eye tracker system associated with the display.

17. The apparatus according to claim 10, wherein the display is a head or helmet-mounted display (HMD) arranged to display collimated images and wherein the rate data are received from, or derived from output by, a head or helmet tracker system.

18. A computer program product comprising one or more non-transitory computer-readable mediums having stored thereon computer program code which when executed by one or more processors cause a process to be carried out for controlling a display device to generate an image for viewing by a user on a display, the image being formed by at least three light components having predetermined relative timings, the process comprising:
 receiving image data defining an intended position of first, second, and third light components of a feature to be sequentially displayed as an element in the image;
 receiving rate data indicative of a rate of change in orientation of the display relative to a direction of gaze of an eye of the user;
 determining a displaced position on the display for displaying each of the first and third light components of the feature by adjusting the intended position of the first and third light components according to the received rate data and the predetermined relative timings relative to a timing of the second light component, the displaced position of the first and third light components being different from the intended position of the second light component; and
 outputting the displaced position of each of the first and third light components to the display device for display of the first and third light components at the respective displaced position, and outputting the intended position of the second light component to the display device for display of the second light component at the intended position.

19. The computer program product according to claim 18, wherein determining the displaced position on the display for displaying each of the first and third light components includes receiving data indicative of an orientation of the display in inertial space and determining a position on the display such that the feature appears aligned to a predetermined line of sight to a point in inertial space.

20. The computer program product according to claim 18, wherein the at least three light components include light components sequentially displayed in three respective phases, the phases having said predetermined relative timings.

* * * * *